(12) United States Patent
Ford

(10) Patent No.: US 6,405,445 B1
(45) Date of Patent: Jun. 18, 2002

(54) TOOL AND METHOD FOR MEASURING THE RIDE HEIGHT OF A VEHICLE

(75) Inventor: David B. Ford, Denton, TX (US)

(73) Assignee: Paccar INC, Bellevue, WA (US)

( * ) Notice: Subject to any disclaimer, the term of this patent is extended or adjusted under 35 U.S.C. 154(b) by 28 days.

(21) Appl. No.: 09/627,955

(22) Filed: Jul. 28, 2000

(51) Int. Cl.[7] .......................... G01B 5/24; G01D 21/00
(52) U.S. Cl. .................. 33/203.15; 33/600; 33/608; 33/613
(58) Field of Search .................. 33/203.15, 203.18, 33/203.17, 203, 832, 833, 193, 600, 608, 613, 644, 645

(56) References Cited

U.S. PATENT DOCUMENTS

| | | | | |
|---|---|---|---|---|
| 2,325,558 A | * | 7/1943 | Uslan | 33/832 |
| 2,468,995 A | * | 5/1949 | Morrison | 33/832 |
| 2,519,942 A | * | 8/1950 | Tedrick | 33/832 |
| 2,670,542 A | * | 5/1954 | Hull | 33/832 |
| 2,743,527 A | * | 5/1956 | Gens | 33/832 |
| 3,190,008 A | * | 6/1965 | Weiss | 33/709 |
| 4,114,220 A | * | 9/1978 | Pfister | 33/293 |
| 4,294,016 A | * | 10/1981 | Wilkerson | 33/180 AT |
| 5,369,602 A | * | 11/1994 | Naas et al. | 33/203.18 |
| 5,398,419 A | * | 3/1995 | Schmidt et al. | 33/203 |
| 5,586,062 A | * | 12/1996 | Colarelli, III | 33/203.18 |

* cited by examiner

*Primary Examiner*—Diego Gutierrez
*Assistant Examiner*—Mirellys Jagan
(74) *Attorney, Agent, or Firm*—Sidley Austin Brown & Wood LLP

(57) ABSTRACT

A tool for indicating whether a measured ride height of a vehicle is within a tolerance range for a specified ride height is provided. The measured ride height is equal to a vertical distance between a reference surface of the vehicle, such as a vehicle frame rail at a suspension centerline, and a rotational axis of a vehicle wheel. The tool has a support member, a first measurement member, and a second measurement member.

38 Claims, 10 Drawing Sheets

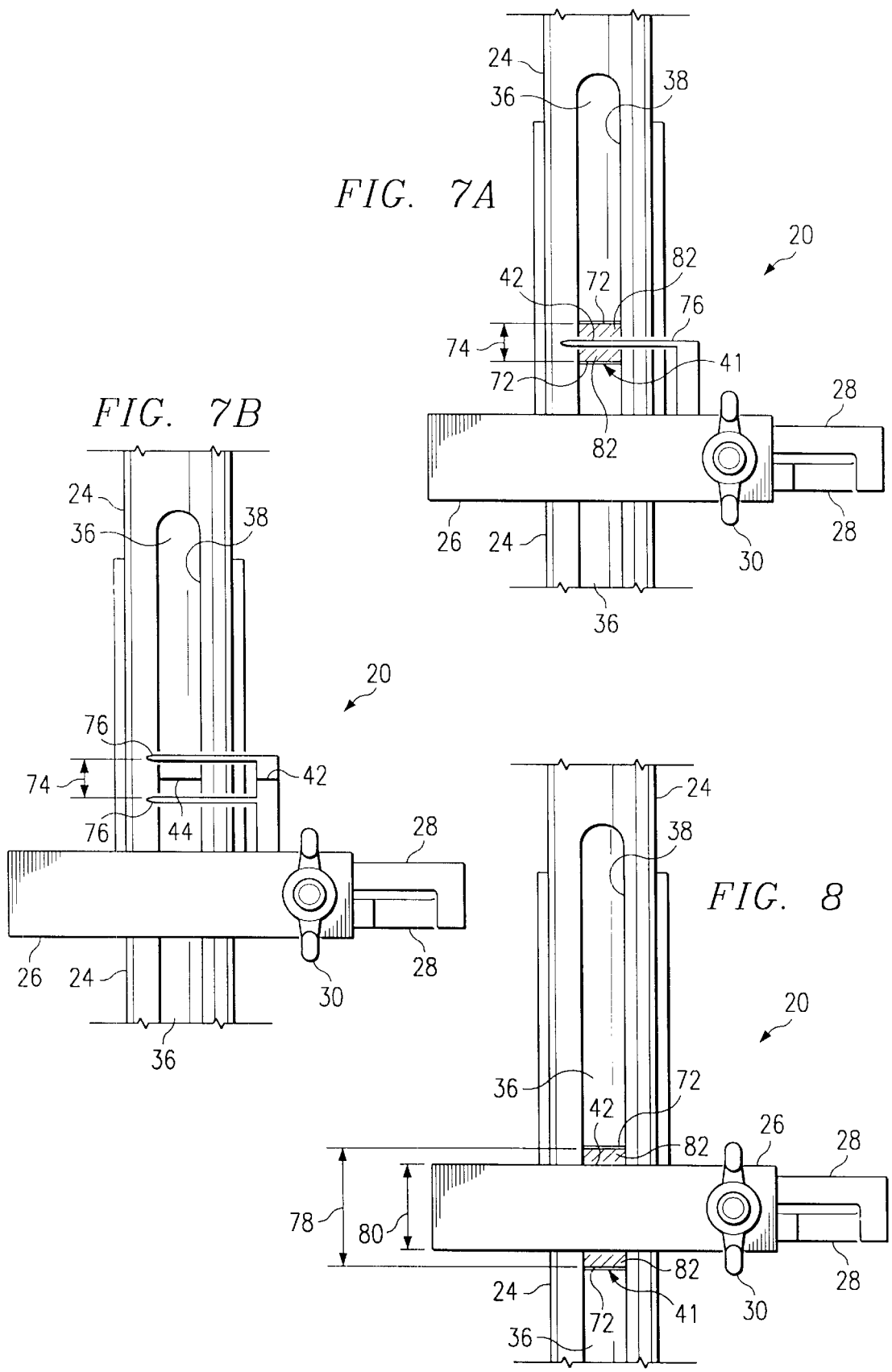

TOOL AND METHOD FOR MEASURING THE RIDE HEIGHT OF A VEHICLE

TECHNICAL FIELD OF THE INVENTION

This invention relates to a tool for measuring the ride height of a vehicle. In particular, it relates to a tool having a support member and two measurement members for determining whether a measured ride height of a vehicle is within a tolerance range for a specified ride height.

BACKGROUND OF THE INVENTION

A ride height for a vehicle or trailer is typically defined as a vertical distance between a wheel's axis of rotation and the bottom of the frame rail at the centerline of the vehicle/trailer suspension. The centerline of the suspension varies per design. For example, the centerline of the suspension on a dual or tandem axle design is usually half-way between the two tandem axles. Whereas, the centerline of the suspension of a single axle design is longitudinally aligned with the wheel's axis of rotation.

Truck manufacturing is one example of a time when the ride height needs to be measured and adjusted. A truck manufacturer must typically measure and adjust the ride height of a newly built truck on the production line to meet the design specifications. In the past, the truck manufacturer typically made such measurements by having a technician or engineer crawl under the newly built truck and manually measure the vertical distance between the bottom of the frame rail and the bottom of the air spring (which is at a known distance with respect to an axis of rotation) using a tape measure. The actual ride height was then calculated from the frame rail-to-air spring distance. This actual ride height was then compared to the manufacturer's design to see if it was within the specified range of tolerance. If the ride height was outside the specified range, then the ride height was adjusted, and the manual measurement was repeated after each ride height adjustment. This process was repeated until the ride height was within the manufacturer's design range.

This method of measuring the ride height is cumbersome, time consuming, and prone to errors for a number of reasons. First, using a tape measure to gauge the vertical distance is inherently inaccurate because often such vertical distance is between two points that are not along a mutual vertical axis. For instance, on a tandem axle truck the centerline of the rear suspension is often not longitudinally aligned with the air spring. Thus any rake or tilt in the frame rail can create inaccuracies in the measurement. Also, measurements taken from a graduated scale having standard inch or metric increments, such as a typical tape measure, are slow and tedious to repeatedly read and subject to human error upon repeated use. Secondly, the measurement between the bottom of the frame rail and the bottom of the air spring used in the past by truck manufacturers may not be the true ride height measurement per the design. The reason for the variance is that often the builder or assembler must shim the axle during assembly. Hence, the spatial relationship between the frame rail, air spring, and wheel axle may vary depending on the size and number of shims needed during assembly. Thirdly, this method of measuring ride height does not make the application of measurement tolerance ranges convenient.

Another instance when the ride height may need to be measured and adjusted is when installing or repairing a vehicle suspension having an adjustable ride height, such as an air spring suspension on a heavy truck. When installing or repairing a vehicle suspension having an adjustable ride height, it is often necessary to measure and adjust the ride height to ensure that the suspension has a ride height that is within the tolerance specified by the manufacturer.

The proper ride height and elimination of frame rake or tilt are especially important on tandem axle vehicles because deviation from the design ride height can generate excessive vibrations in the drivetrain. Such vibrations in the drivetrain often cause damage to various drivetrain components, such as transmission synchronizers. Therefore, to improve the production quality and reliability of vehicles manufactured having adjustable suspensions, such as the truck manufacturing example above, there is a need for a tool, as well as a method of using such tool, to enable a more accurate and convenient measurement of ride height. Such a tool and method will enable an assembler or builder, as well as repair persons, to more efficiently build or rebuild a suspension within the proper design tolerances and specifications. Also, there is a need for a less time consuming way to measure the ride height. Furthermore, there is a need for a tool for measuring ride height that provides a tolerance range for the measurement.

SUMMARY OF THE INVENTION

Many of the needs outlined above are addressed by the present invention. It is an object of the present invention to provide a tool and method for using such tool for accurately measuring the ride height of a vehicle without facilitating human errors when reading the measurement.

Another object of the present invention is to provide a tool and method for using such tool for measuring a ride height of a vehicle easier and faster than prior tools/methods.

Yet another object of the present invention is to provide a tool and method for using such tool for measuring a ride height of a vehicle while adjusting the suspension of the vehicle without removing the tool from its measuring position.

Still another object of the present invention is to provide a tool and method for using such tool for measuring a ride height of a vehicle within a specified tolerance range.

In accordance with one aspect of the present invention, a tool is provided for indicating whether a measured ride height of a vehicle is within a tolerance range for a specified ride height. The measured ride height is equal to a vertical distance between a reference surface of the vehicle, such as a vehicle frame rail at a suspension centerline, and a rotational axis of a vehicle wheel. The tool comprises a support member, a first measurement member, and a second measurement member. The support member is adapted to extend vertically upwards from a generally horizontal reference surface. The first measurement member has a slidable relationship with respect to the support member to allow relative vertical movement therebetween. The first measurement member has a first reference mark defined thereon. The second measurement member has a slidable relationship with respect to the support member also to allow relative vertical movement therebetween. The second measurement member has a second reference mark defined thereon and an upper end. The second reference mark has a position selected to substantially align with the first reference mark when a vertical distance between the upper end of the second measurement member and the first reference mark corresponds to the specified ride height. The tool may also include a range indicator to define a tolerance range for the specified ride height.

In accordance with another aspect of the present invention, a tool is provided for measuring a ride height of a vehicle. The tool comprises a support member, a first measurement member, and a second measurement member with a graduated scale thereon. The support member is adapted to extend vertically upwards from a generally horizontal reference surface. The first measurement member is releasably attached to the support member so as to be vertically repositionable along the support member. The first measurement member has a first reference mark defined thereon. The second measurement member has a slidable relationship with respect to the support member to allow relative vertical movement therebetween. The second measurement member has the graduated scale defined thereon and an upper end. The first reference mark aligns with a vertical position on the graduated scale to indicate a measurement of the ride height when the upper end is vertically aligned with the reference surface of the vehicle.

In accordance with yet another aspect of the present invention, a tool is provided for indicating whether a measured ride height of a vehicle meets a predetermined ride height. The tool comprises a support member, a first measurement member, and a second measurement member. The support member is adapted to extend vertically upwards from a generally horizontal reference surface. The first measurement member is movably fixed relative to the support member, and it has a first reference mark defined thereon. The second measurement member has a slidable relationship with respect to the support member to allow relative vertical movement therebetween. Also, the second measurement member has a slidable relationship with respect to the first measurement member to allow relative vertical movement therebetween. The second measurement member has a second reference mark defined thereon and an upper end. The second reference mark has a position selected to substantially align with the first reference mark when a vertical distance between the upper end of the second measurement member and the first reference mark corresponds to the specified ride height.

In accordance with yet another aspect of the present invention, a method of using the tool to indicate the ride height of a vehicle and a method of adjusting a vehicle ride height while checking the ride height measurement are provided.

BRIEF DESCRIPTION OF THE DRAWINGS

Other objects and advantages of the invention will become apparent upon reading the following detailed description and upon reference to the accompanying drawings in which:

FIG. 7A is a partial front view of a tool according to a third embodiment of the present invention;

FIG. 7B is a partial front view of a tool according to an alternative embodiment of the present invention;

FIG. 8 is a partial front view of a tool according to a fourth embodiment of the present invention;

DETAILED DESCRIPTION OF THE INVENTION

Figure 1:
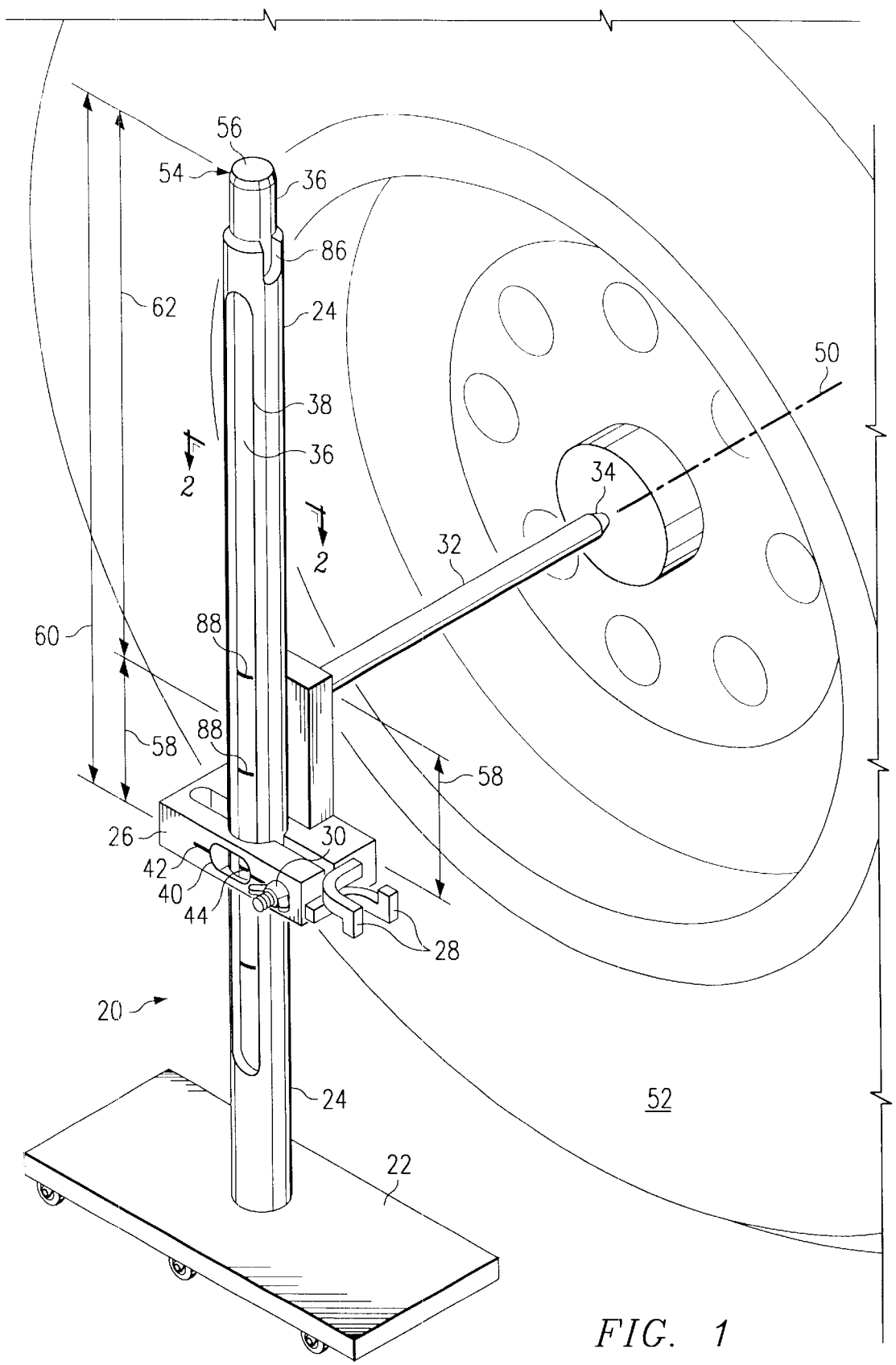
FIG. 1 is a perspective view of a tool according to a first embodiment of the present invention positioned next to a vehicle wheel.

Referring now to the drawings, wherein like reference numbers are used to designate like elements throughout the various views, several embodiments of the present invention are further described.

Figure 2:
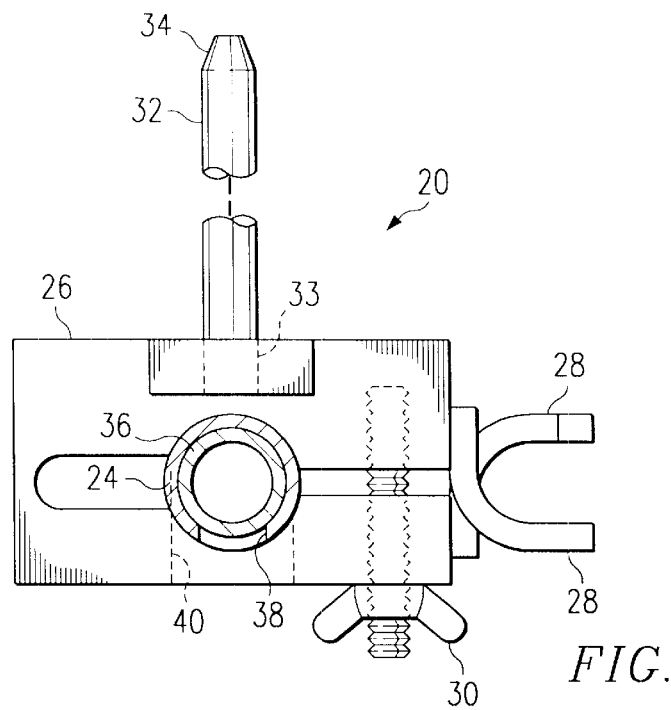
FIG. 2 is a top cross-sectional view of the tool taken along line 2—2 of FIG. 1.

FIGS. 1–5 show a tool 20 according to a first embodiment of the present invention. As shown in FIG. 1, the tool 20 has a base 22 for stabilizing the tool and allowing it to stand freely. A support member 24 is attached to the base 22 and extends generally vertically upwards from the base 22 when the base 22 is positioned on a generally horizontal surface (e.g., the ground). A first measurement member 26 is movably attached to the support member 24, and it is vertically repositionable along the support member 24. As best shown in FIG. 2, in this embodiment the first measurement member 26 has a generally c-shaped structure defining a passage for receiving the support member 24. The inner diameter of the c-shaped structure may be sized such that the first measurement member 26 is biased against the support member 24.

Figure 3:
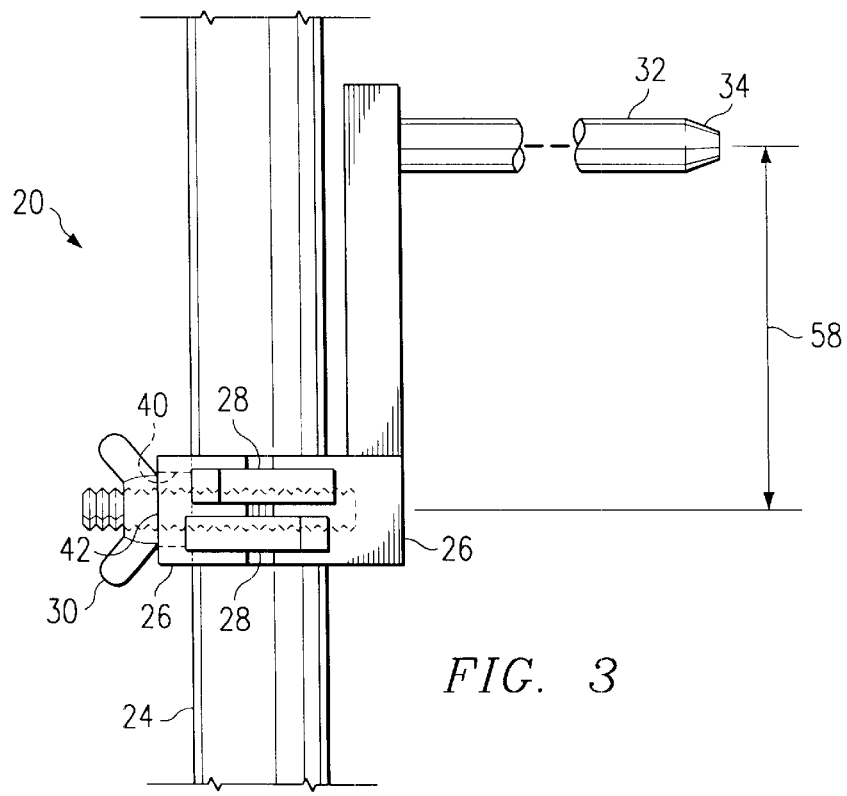
FIG. 3 is a side view of the first measurement member of FIG. 1.

As best seen in FIGS. 2 and 3, a pair of squeeze tabs 28 are provided on the first measurement member 26 to facilitate overcoming the bias of the c-shaped structure to allow the first measurement member to be more easily slid along the support member 24. When the squeeze tabs 28 are released, the clamping of the first measurement member 26 about the support member 24 may maintain the vertical position of the first measurement member relative to the support member 24. In another embodiment, there may be only one squeeze tab that may be pressed relative to the first measurement member 26 to spread open the c-shaped structure. As also shown in FIGS. 2 and 3, a fastener 30 may also be used to supplement the bias of the first measurement member 26 about the support member 24 to more firmly affix the first measurement member 26 to the support member 24. The fastener 30 may be any of various commonly known fasteners, including but not limited to being a bolt, pin, clamp, clip, elastic strap, electro-magnet, or latch.

The primary purpose of the first measurement member 26 is to provide a first reference mark 42 that corresponds to the vertical position of the rotational axis 50 of the vehicle wheel 52. As shown in FIGS. 1–3, a pointer 32, having a proximal end 33 and a distal end 34, is attached to the first measurement member 26 at its proximal end 33. The pointer 32 is used to align the first measurement member 26 with the rotational axis 50 of the vehicle wheel 52, as shown in FIG. 1. The pointer 32 is vertically offset from the first reference mark 42 by a first predetermined distance 58, which may vary for a given application.

Figure 4:
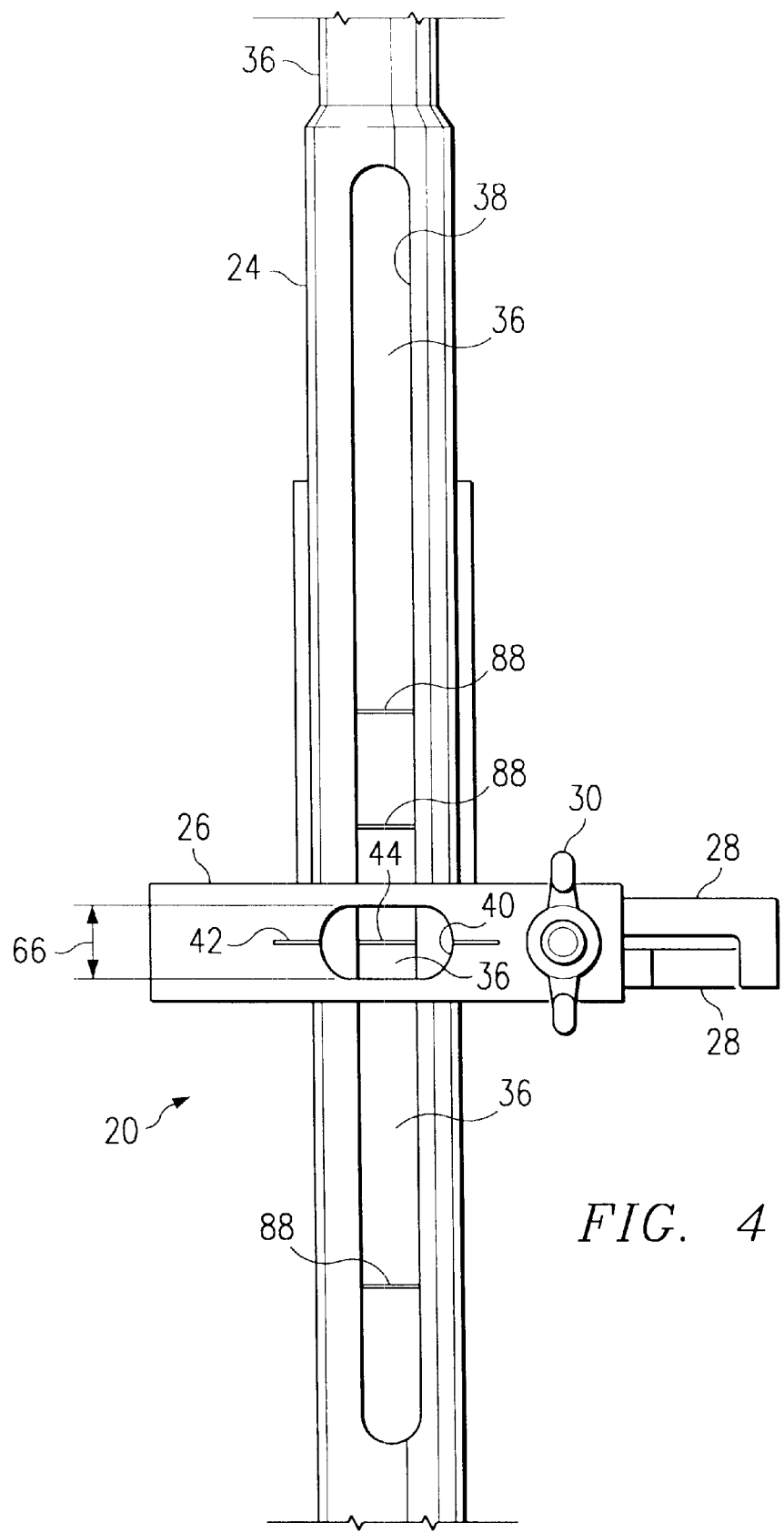
FIG. 4 is an enlarged partial front view of the tool of FIG. 1.

A second measurement member 36 is slidably mounted within the support member 24 such that the second measurement member 36 may freely move vertically relative to the support member 24. A view window 38 is formed in the support member 24 along a portion of its longitudinal extent. The view window 38 provides a view of the second measurement member 36 within the support member 24, which will be discussed further below. As shown in FIGS. 1 and 4, the second measurement member 36 has a second reference mark 44 formed thereon. The second reference mark 44 may be viewed on the second measurement member 36 through the view window 38 and through a tolerance window 40, depending on the vertical position of the second measurement member 36 relative to the support member 24. The second reference mark 44 corresponds to the vertical position of the vehicle frame rail 48 (see FIG. 5).

As shown in FIGS. 1–5, the tolerance window 40 is formed on the first measurement member 26 by a hole projecting through one side of the first measurement member 26. The first reference mark 42 is located at the tolerance window. The height of the hole defining the tolerance window 40 provides a tolerance range for determining whether the second reference mark 44 is sufficiently aligned, i.e., within tolerance, with the first reference mark 42, as best shown in FIG. 4.

Figure 5:
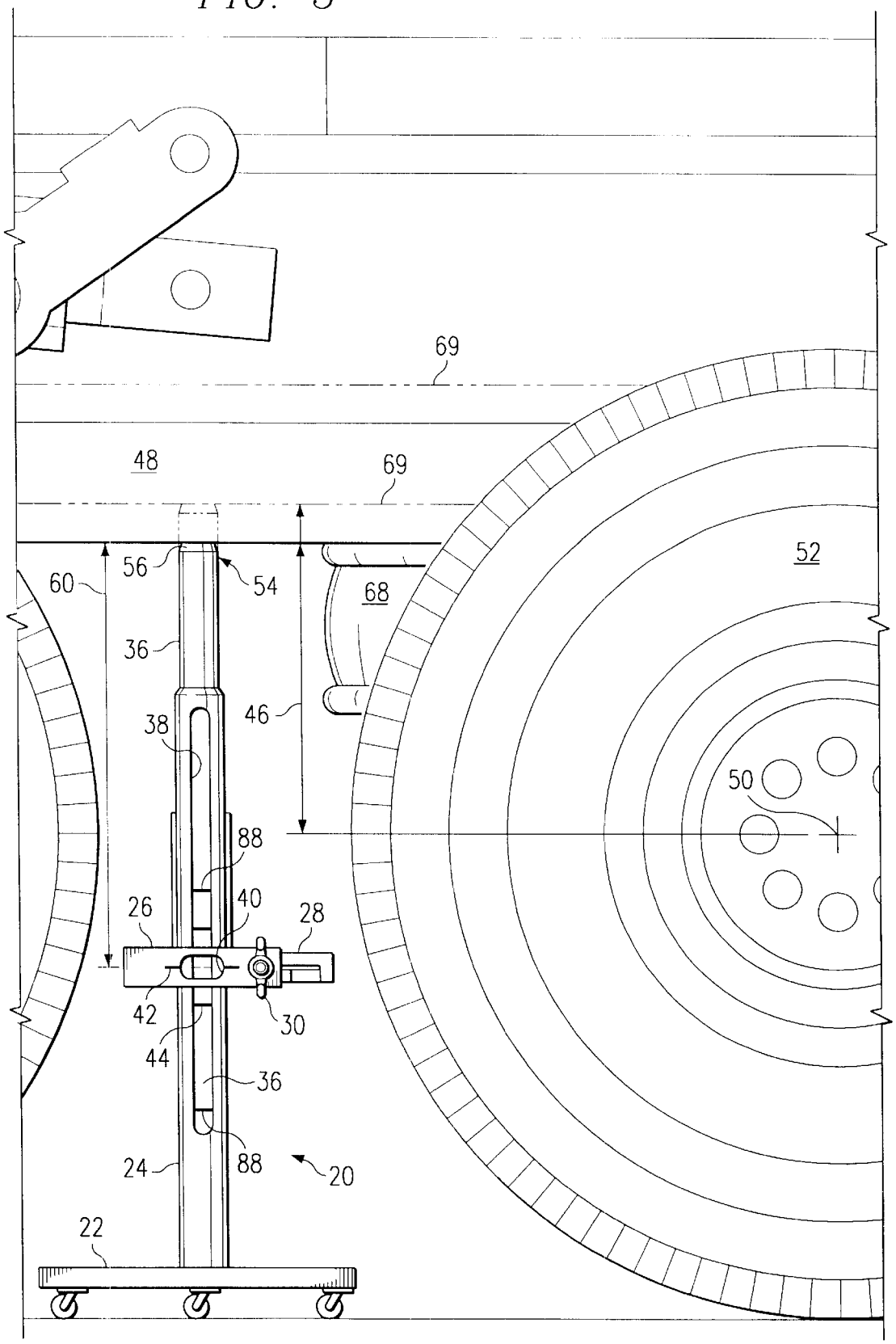
FIG. 5 is a front view of the tool of FIG. 1, showing the tool positioned under a vehicle frame rail.

The remaining features of the tool will be explained below while discussing a method of using the tool. One possible method of using the first embodiment of the present invention is to set the ride height of a vehicle, as shown in FIGS. 1 and 5. The tool 20 may be used for determining whether a measured ride height of the vehicle is within a tolerance range for a specified ride height. The ride height is the vertical distance (as indicated by reference number 46 in FIG. 5) between a reference surface, such as the bottom of a vehicle frame rail 48 at the suspension centerline, and the rotational axis 50 of a vehicle wheel 52.

Measurement of the actual ride height of a vehicle using the present invention may be performed using the following method. First, referring to FIG. 1, the tool 20 is placed proximate to a vehicle wheel 52. The first measurement member 26 of the tool 20 is vertically positioned along the support member 24 such that the distal end 34 is approximately at the same vertical position as the wheel's rotational axis 50. To more easily move the first measurement member 26 along the support member 24, the squeeze tabs 28 may be pressed to spread open the c-shaped structure of the first measurement member 26. When the vertical position of the first measurement member 26 is satisfactory (i.e., when the distal pointer end 34 is at the same vertical level as the wheel's rotational axis 50), the squeeze tabs 28 are released to allow the c-shaped structure of the first measurement member 26 to spring back to its initial configuration, thereby being biased against the support member 24. The bias of the first measurement member 26 against the support member 24 may maintain the vertical position. The fastener 30 can now be tightened to more firmly secure the vertical position of the first measurement member 26 relative to the support member 24. In this manner, the first reference mark 42 on the first measurement member 26 is positioned at a vertical level corresponding to the vertical position of the wheel's rotational axis 50.

Next, as shown in FIG. 5, the tool 20 (with the first measurement member 26 locked in position as previously described) is positioned directly beneath the vehicle frame rail 48 at the suspension centerline, which is between the tandem axles on the vehicle shown in FIG. 5. The second measurement member 36 of the tool 20 is moved vertically relative to the support member 24 until it abuts the reference surface, in this case, the bottom of the vehicle frame rail 48.

Hence, the upper end 54 of the second measurement member 36 is at the same vertical position as the bottom of the vehicle frame rail 48. The vertical position of the upper end 54 is maintained against the bottom of the frame rail 48 by a magnet 56 attached to the upper end (assuming that the vehicle frame rail 48 is made from a magnetic material, e.g., steel). Thus, as the suspension is adjusted, the second measurement member 36 and frame rail 48 move together with respect to the support member 24 and first measurement member 26.

After completing the two steps described above, the vertical distance between the upper end 54 and the first reference mark 42 corresponds to the actual ride height of the vehicle. The vertical distance between the upper end 54 and the second reference mark 44 is selected to correspond to the specified ride height (i.e., desired ride height). However, it should be noted that in this embodiment, the vertical position of the first reference mark 42 is not the same as that of the distal end 34 of the pointer 32, which coincides with the vertical position of the wheel's rotational axis 50. As a result, there is a first predetermined distance (indicated by reference number 58 in FIGS. 1 and 3) between the distal end 34 and the first reference mark 42. Hence, referring to FIG. 1, the vertical distance between the upper end 54 and the second reference mark 44 is a second predetermined distance (indicated by reference number 60), which equals the specified ride height (indicated by reference number 62) plus the first predetermined distance 58.

When the second reference mark 44 aligns with the first reference mark 42, then the measured ride height 46 is at the specified ride height (i.e., measured ride height 46 is substantially equivalent to specified ride height 62). The height of the tolerance window (indicated by reference number 66 in FIG. 4) is selected to match the tolerance range for the specified ride height. Thus, when the second reference mark 44 is visible through the tolerance window 40, the actual ride height is within the manufacturer's tolerance range for the specified ride height. The tolerance window height 66 may be changed (e.g., through the use of interchangeable windows (not shown)) to directly indicate different tolerance ranges (e.g., for different trucks or different suspensions). Hence, the measured ride height 46 is within a tolerance range for the specified ride height 62 when the second reference mark 44 is within the tolerance window 40. The second reference mark 44 can be viewed within the tolerance window 40 via the hole projected through the first measurement member 26 forming the tolerance window and via the view window 38. These windows are necessary in this embodiment because the second reference mark 44 is located on the second measurement member 36, which is concentrically within the support member 24 and the first measurement member 26, as shown in FIG. 2. In another possible embodiment (see FIG. 11), a view window 38 in the support member 24 or the second measurement member 36 may not be needed, such as in some cases where the second measurement member 36 is adapted for sliding along the outside of the support member 24.

If the second reference mark 44 does not fall within the tolerance window 40 (i.e., the tolerance range), then the actual ride height 46 is not sufficiently close to the specified ride height 62 within the tolerance range and the actual ride height should be adjusted. The vehicle shown in FIG. 5 is equipped with an air spring suspension that can be adjusted by changing the air pressure within an air spring 68. When the suspension is adjusted, the vertical position of the wheel's rotational axis 50 typically will not vary. Hence, because the first reference mark 42 is already locked in place and the second measurement member 36 can freely move vertically within the support member 24, the tool 20 may be left in place while adjusting the ride height 46 (i.e., while adjusting the air pressure in the air spring 68). The magnet 56 on the upper end 54 of the second measurement member 36 maintains the vertical position of the upper end as the vehicle frame rail 48 rises (or falls) during adjustment of the ride height 46 (as shown by phantom lines 69). Thus, the vertical position of the second reference mark 44 relative to the tolerance window 40 may be monitored while the ride height 46 is adjusted. This allows the ride height to be adjusted while monitoring whether the actual ride height 46 (measured) is within the tolerance range 66 of the specified ride height 62.

Figure 6:
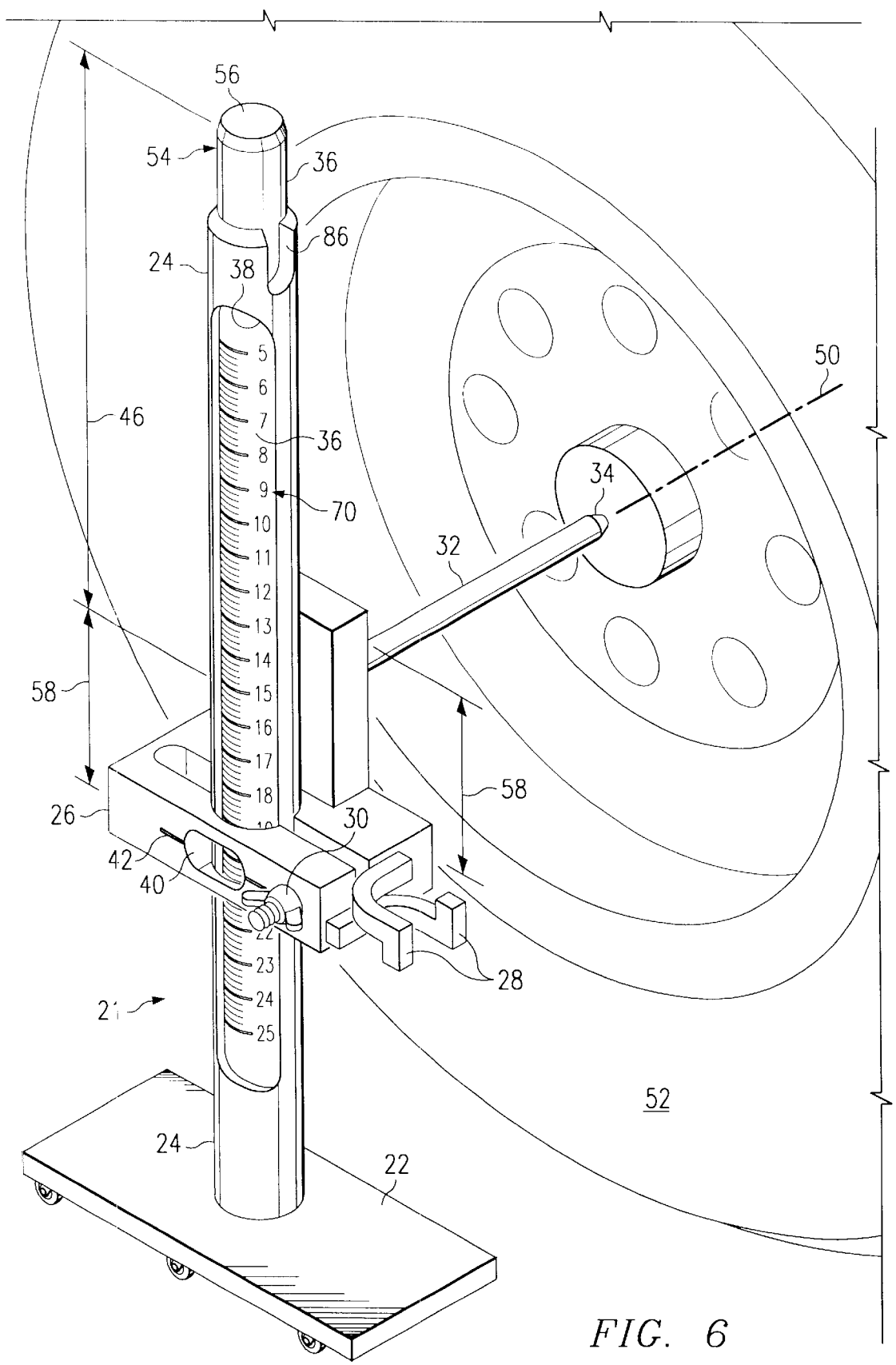
FIG. 6 is a perspective view of a tool according to a second embodiment of the present invention.

As shown in FIG. 6, a second embodiment of the present invention has a graduated scale 70 along the longitudinal extent of the second measurement member 36, which may be scaled in inches and/or metric units. The ride height measurement can be read from the scale 70 where first reference mark 42 intersects the scale. The tool 21 can be used the same way as the tool 20 of the first embodiment, except that the first reference mark is aligned with a mark on the scale 70 within the tolerance window 40 instead of the second reference mark 44. The graduated scale 70 may be vertically offset to accommodate for a first predetermined distance 58 due to the distal pointer end 34 not being at the same vertical level as the first reference mark 42. Thus, with such embodiment, the tool 20 may be used to measure a ride height value in inches or metric units. Such measured ride height value may then be compared to a specified ride height value to determine whether the measured ride height 46 is equal to a specified ride height or within a tolerance range for a specified ride height.

Various other embodiments of the present invention may use alternative geometries that are equivalent, i.e., they achieve the same functions and results as discussed above. For example, in the first embodiment discussed in detail above, the support member 24 and the second measurement member 36 are tubular bodies having circular cross-sections such that the second measurement member fits concentrically within the support member. In other embodiments, the support member 24 and second measurement member 36 may have other cross-section geometries, including but not limited to being; oval, square, rectangular, triangular, or octagonal. An embodiment of the present invention may have a variety of heights or sizes to accommodate a given vehicle. An embodiment may or may not have a base 22 attached to the support member 24. For example, if the geometry of the bottom end of the support member 24 is such that the support member 24 can stand freely without a base 22, then a base is not needed (see FIG. 14). Also, other embodiments may incorporate a variety of materials to form the components, including but not limited to: steel, aluminum, titanium, nickel alloys, plastic, polymers, fiberglass composites, resin-based composites, PVC, or wood.

An embodiment of the present invention may or may not have a tolerance window 40 adapted for providing a tolerance range for the specified ride height. For example, an embodiment (not shown) without a tolerance range may have a single mark designating the second reference mark 44 and a single indicator (e.g., a needle extending from the first measurement member 26) designating the first reference mark 42. In such example, the second reference mark 44 will align with the first reference mark 42 when the measured ride height 46 is at the specified ride height 62.

Other embodiments may have a tolerance range at the first reference mark 42 and/or the second reference mark 44. For example, in a third embodiment shown in FIG. 7A, a tolerance band 41 may be formed by two marks 72 separated by a spaced distance (indicated by reference number 74) at the second reference mark 44, where the spaced distance 74 equals the tolerance range for the specified ride height. In such example, the first reference mark 42 may be a needle 76 extending from the first measurement member 26. However in a fourth embodiment shown in FIG. 8, the first reference mark may be the first measurement member 26 itself, where the height of the tolerance band 41 is increased to compensate for the height of the first measurement member 26. Hence, the height (indicated by reference number 78 in FIG. 8) of the tolerance band 41 (defined between the two marks 72 on the second measurement member 36) is equal to the height of the first measurement member (indicated by reference number 80) plus the tolerance range for the specified ride height 62. Yet another embodiment may have a tolerance range, as in FIGS. 7A and 8, formed by a tolerance band 41 having a wide band (indicated by reference number 82 in FIGS. 7A and 8) being a different color shade than the second measurement member 36. Thus, in such embodiment, the vertical width of the band 82 defines the height of the tolerance band 41 (i.e., size of tolerance range). Still another possible embodiment, as shown in FIG. 7B, may have two needles 76 extending from the first measurement member 26 to form a tolerance window at the first reference mark 42, where the two needles extend along substantially parallel horizontal planes. The vertical distance between the two needles (i.e., the tolerance window height 74) defines the tolerance range for the specified ride height. Therefore, an embodiment may have a tolerance range formed at the first reference mark 42 and/or second reference mark 44 created by various means, or there may be no tolerance range.

Figure 9:
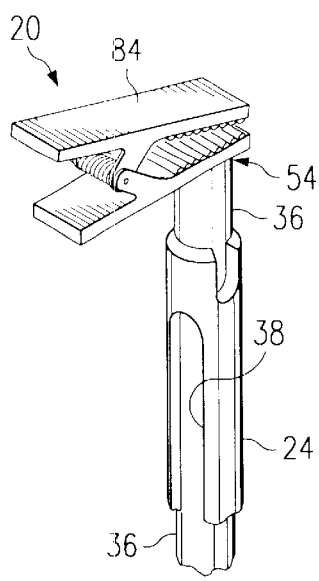
FIG. 9 is a partial perspective view of a tool according to a fifth embodiment of the present invention.
Figure 10:
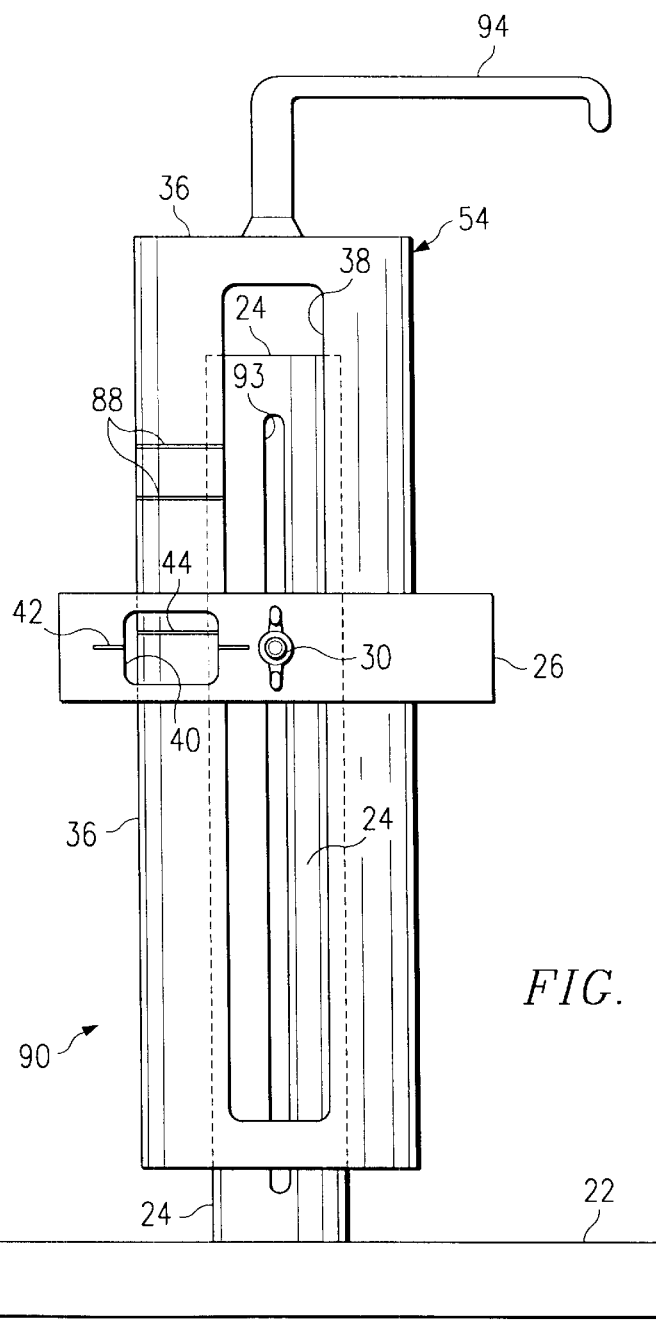
FIG. 10 is a front view of a tool according to a sixth embodiment of the present invention.
Figure 11:
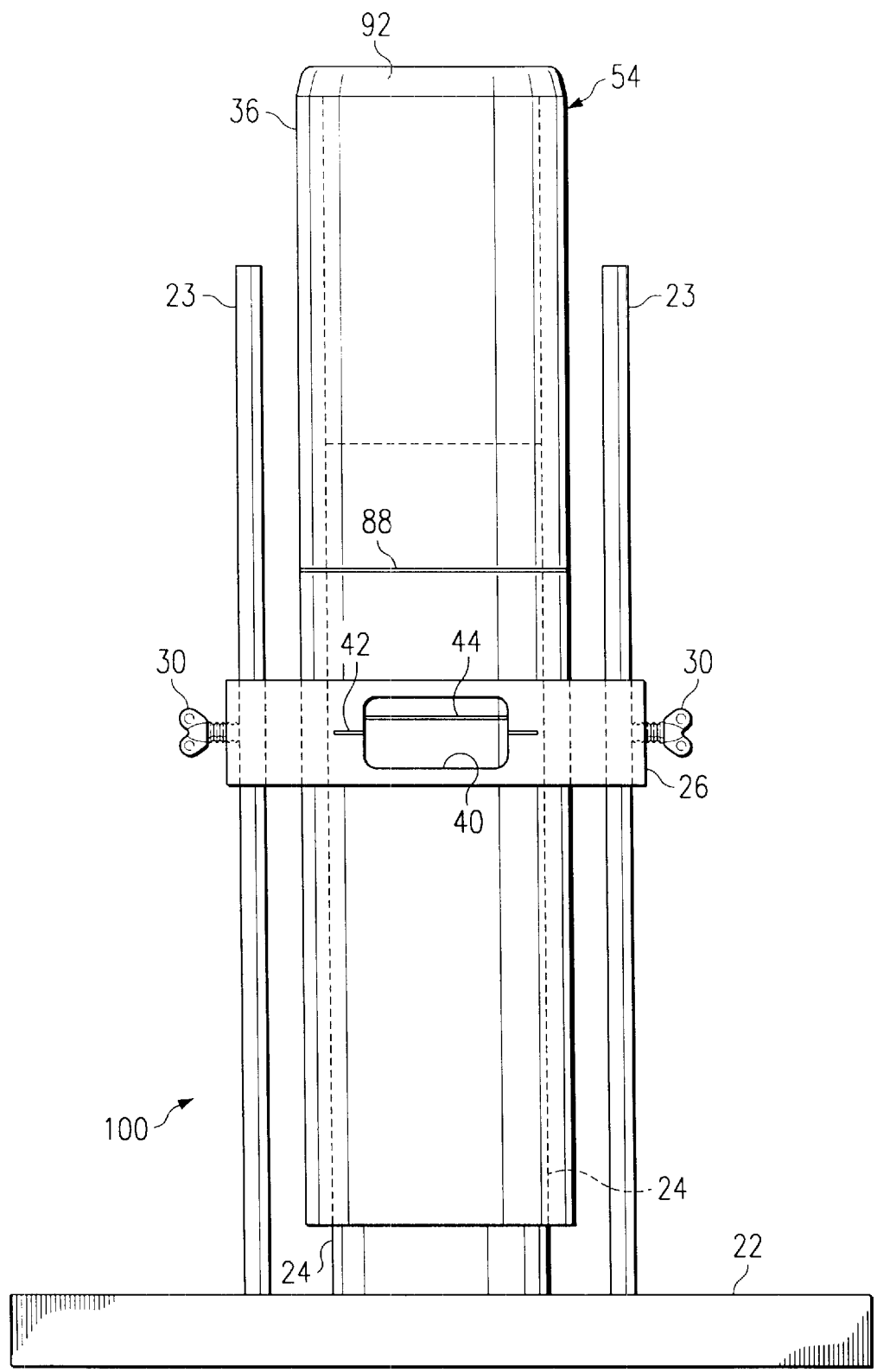
FIG. 11 is a front view of a tool according to a seventh embodiment of the present invention.

While the first embodiment previously discussed uses a magnet to temporarily attach the upper end 54 of the second measurement member 36 to the vehicle frame rail 48 to maintain the vertical position of the second measurement member relative to the frame rail, other methods can be used. For example, if the vehicle frame rail 48 is made of a non-magnetic material (e.g., aluminum, carbon-fiber composite), the magnet 56 will not work. Hence, other embodiments may incorporate other methods, including but not limited to a frame rail clamp 84 (as shown in FIG. 9), a hook 94 (as shown in FIG. 10), an adhesive element 92 (as shown in FIG. 11), a clip, and/or a hook-and-latch fastener, each being attached to the upper end 54. Also, depending on the vehicle frame rail configuration, the attachment means may not be located on the top side of the upper end 54. Instead, the attachment methods may be on the side of the upper end 54 or extended above the top of the upper end to accommodate a given vehicle frame rail configuration.

FIG. 10 shows a tool 90 according to a sixth embodiment having the second measurement member 36 adapted to slide along the outside of the support member 24. The first measurement member 26 movably attaches to the support member 24 with the fastener 30 through a slot 93 formed in the support member. The tolerance window 40 is formed through the first measurement member 26 to provide the tolerance range for the specified ride height 62. The second reference mark 44 is formed on the second measurement member 36 at a location where is can be viewed through the tolerance window 40.

FIG. 11 shows a tool 100 according to a seventh embodiment having the second measurement member 36 adapted to slide along the outside of the support member 24. The first measurement member 26 movably attaches to the base 22 by vertical extensions, or beams, 23. Also, the first measurement member 26 could be movably attached to the support member 24 if the vertical extensions 23 extend from the support member 24. An adhesive element 92 (e.g., to attach to a non-magnetic vehicle frame rail) is attached to the upper end 54 of the second measurement member 36. This embodiment does not need the view window 38 (see FIGS. 1, 6, and 10) because the second reference mark 44 is on the outside of the second measurement member 36, which is on the outside of the support member 24.

Figure 12:
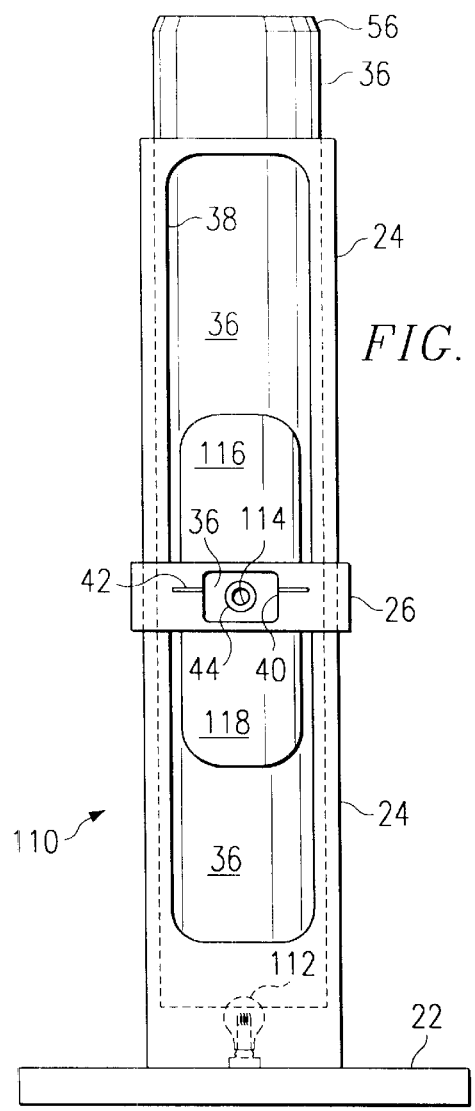
FIG. 12 is a front view of a tool according to an eighth embodiment of the present invention.

FIG. 12 shows a tool 110 according to an eighth embodiment of the present invention. A light source 112 is located within the support member 24 for shining light within the support member 24 and within the second measurement member 36 during use of the tool. A hole 114 is formed in the second measurement member 36. The hole 114 acts as the second reference mark 44. The light shining within the second measurement member 36 can be seen via the hole 114. A first shield 116 extends upwardly from the first measurement member 26. Also, a second shield 118 extends downwardly from the first measurement member 26. The shields 116, 118 are coincident with a portion of the path that the hole 114 travels along the vertical extent of the tool 110. Hence, when viewing the front of the tool 110, the hole 114 is not seen until it is located within the tolerance window 40. When the second reference mark 44 is within the tolerance window 40, the light shining through the hole 114 can be seen through the tolerance window 40. Therefore, this embodiment provides a way to see when the second reference mark 44 is within the tolerance window 40 from a distance.

Another embodiment may not incorporate the shields 116, 118. However, the shields 116, 118 help ensure that the user is seeing the second reference mark 44 within the tolerance window 40 when the user sees the light shining through the hole 114 from a distance, rather than seeing the second reference mark 44 above or below the first measurement member 26. Yet another embodiment (not shown) may incorporate a light sensor at the tolerance window 40 to detect when the hole 114 (and the second reference mark 44) is located within the tolerance window 40.

Figure 13:
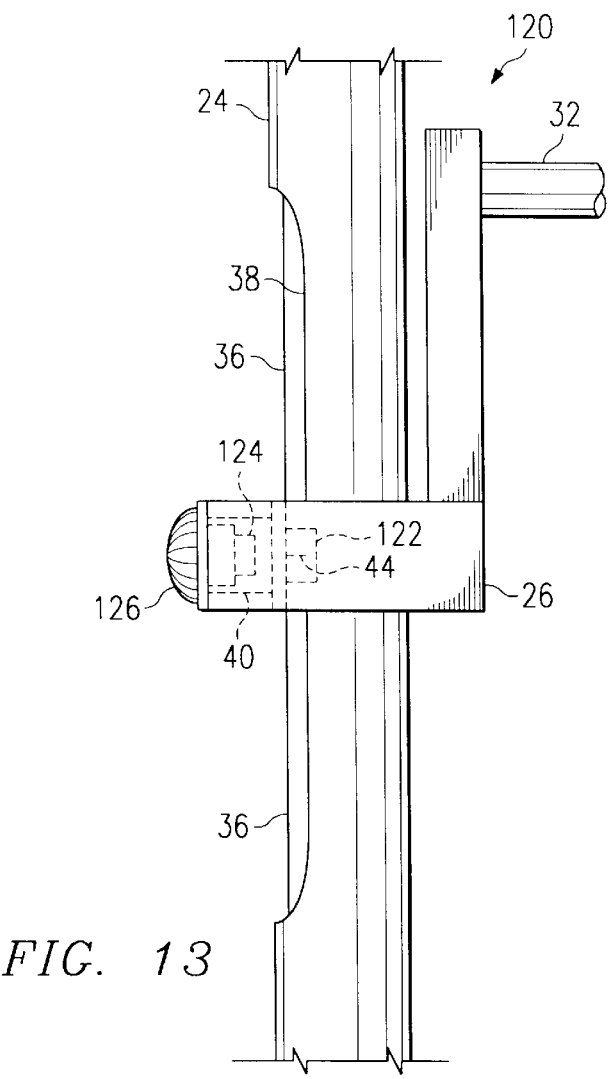
FIG. 13 is a partial side view of a tool according to a ninth embodiment of the present invention.

FIG. 13 shows a partial side view of a tool 120 according to a ninth embodiment of the present invention. A sound transmitting transducer 122 is located at the second reference mark 44 within the second measurement member 36. A sound receiving transducer 124 is located within the tolerance window 40 and on the path that the sound transmitting transducer 122 travels along the vertical extent of the tool 120. An indicator light 126 is mounted on the first measurement member 26. The transmitting transducer 122 emits sound waves at a selected frequency (e.g., ultrasonic) during use of the tool 120. The receiving transducer 124 is adapted to sense the sound waves emitted by the transmitting transducer 122. When the transmitting transducer 122 (and the second reference mark 44) is located within the tolerance window 40, the receiving transducer 124 will receive non-reflected sound waves emitted by the transmitting transducer 122. When the receiving transducer 124 senses sound waves of the frequency emitted by the transmitting transducer 122 and above a selected threshold energy level, the indicator light 126 is illuminated. Thus, when the transmitting transducer 122, which corresponds to the second reference mark 44, is located within the tolerance window 40, the indicator light 126 illuminates to inform the user that the measured ride height is within the tolerance range of the specified ride height 62. An advantage of this embodiment is that the illuminated indicator light 126 may be easily viewed from a distance. In another embodiment, the indicator light 126 may be substituted with a speaker (not shown) to provide an audio indication that the measured ride height is within the tolerance range of the specified ride height. Also in yet another embodiment (not shown), the indicator light 126 may be activated by a physical electrical contact that completes a circuit when the second reference mark 44 is within the tolerance window 40.

Figure 14:
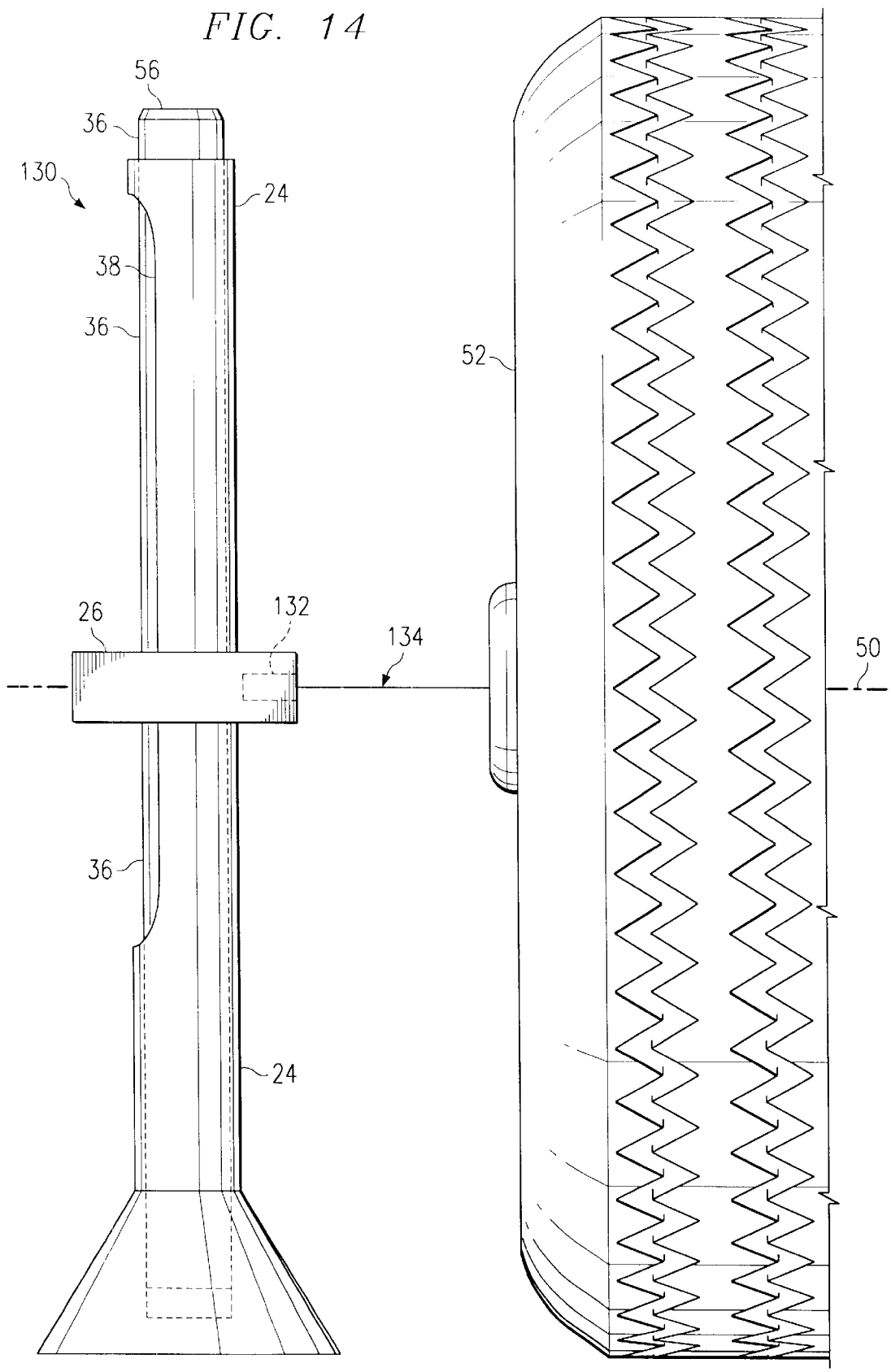
FIG. 14 is a side view of a tool according to a tenth embodiment of the present invention.

FIG. 14 shows a side view of a tool 130 according to a tenth embodiment of the present invention. A laser 132 is located on the back side of the first measurement member 26. The laser 132 emits a laser beam 134 rearward and substantially horizontal relative to a surface on which the tool 130 sits. Thus, the laser 132 acts as the pointer for aligning the first measurement member 26 with the vertical position of the wheel's rotational axis 50.

Considering other possible variations that may be incorporated into other embodiments, the pointer 32 may be above, below, or at the vertical level of first reference mark 42. Hence, the first predetermined distance 58 may have a positive, negative, or zero value relative to the first reference mark 42. In other embodiments, there may be no pointer 32 extending from the first measurement member 26. In such embodiments, the first reference mark 42 itself may be substantially aligned with the wheel's rotational axis 50. As shown in FIG. 1, there may be a finger notch 86 for grabbing the second measurement member 36 if it slides completely within the support member 24. As shown in FIGS. 1 and 4, there may be multiple second reference marks 88 corresponding to different specified ride heights for different vehicle models or different suspension models. In other words, the same tool 20 may be used for different specified ride heights, different vehicles, and/or different suspensions by simply having multiple second reference marks. Such multiple second reference marks 88 may be color coded to alleviate confusion.

There are various commonly known ways of securing the vertical position of the first measurement member 26 relative to the support member 24 other than those already mentioned above. For example, there may be a set screw (not shown) adapted for protruding through the first measurement member 26 and pressing against the support member 24. In alternative, there may be a positioning collar (not shown) below the first measurement member 26, where the collar may be secured to the support member 24 at a given vertical position. When secured to the support member 24, the positioning collar may provide vertical support for the first measurement member 26 to prevent downward vertical sliding along the support member, thereby setting the vertical position of the first reference mark 42. In another embodiment, the first measurement member 26 may have two halves that are hinged together on one side (not shown) such that the two halves may close around the support member 24. Whereas, the other side of such first measurement member 26 may have a fastening means (e.g., bolt, clamp, clip, pin) to hold the two halves together about the support member 24 and thereby secure the vertical position by clamping the first measurement member 26 to the support member.

It will be appreciated by those skilled in the art having the benefit of this disclosure that this invention provides a tool and method for measuring the ride height of a vehicle and indicating whether the measured ride height is within a tolerance range for a specified ride height. It should be understood that the drawings and detailed description herein are to be regarded in an illustrative rather than a restrictive sense, and are not intended to limit the invention to the particular forms disclosed. On the contrary, the invention includes any further modifications, changes, rearrangements, substitutions, alternatives, design choices, and embodiments apparent to those of ordinary skill in the art without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A tool for indicating whether a measured ride height of a vehicle meets a predetermined ride height, said measured ride height being equal to a vertical distance between a reference surface of said vehicle and an axis of rotation of a vehicle wheel, said tool comprising:
   a support member adapted to extend vertically upwards from a generally horizontal reference surface;
   a first measurement member, said first measurement member having (i) a slidable relationship with respect to said support member to allow relative vertical movement therebetween, and (ii) a first reference mark defined thereon; and
   a second measurement member, said second measurement member having (i) a slidable relationship with respect to said support member to allow relative vertical movement therebetween, (ii) a second reference mark defined thereon, and (iii) an upper end, said upper end being removably attachable to said reference surface, wherein said second reference mark has a position selected to substantially align with said first reference mark when a vertical distance between said upper end of said second measurement member and said first reference mark corresponds to said predetermined ride height.

2. A tool in accordance with claim 1, wherein said first measurement member includes a range indicator representative of a tolerance range for said predetermined ride height.

3. A tool in accordance with claim 2, wherein said range indicator is provided by a tolerance window formed in said first measurement member, said tolerance window being a hole projecting through said first measurement member, and a dimension of said tolerance window corresponding to said tolerance range.

4. A tool in accordance with claim 2, wherein said range indicator is provided by two vertically displaced markers, such that a vertical distance between said markers corresponds to said tolerance range.

5. A tool in accordance with claim 3, further comprising a light source located within said support member for shining light within said support member and said second measurement member, and wherein said second reference mark is a hole formed in said second measurement member.

6. A tool in accordance with claim 5, further comprising a shield extending from said first reference member for blocking a front view of a portion of said second measuring member.

7. A tool in accordance with claim 1, further comprising a range indicator representative of a tolerance range for said predetermined ride height formed on said second measurement member corresponding to said second reference mark.

8. A tool in accordance with claim 7, wherein said range indicator is provided by a tolerance band marked on said second measurement member, and a dimension of said tolerance band corresponding to said tolerance range.

9. A tool in accordance with claim 8, wherein said tolerance band is defined by two marks on said second measurement member separated by a spaced distance between said two marks.

10. A tool in accordance with claim 8, wherein said tolerance band is defined by a solid band of a color shaded differently than at least part of said second measurement member, and a dimension of said solid band corresponding to said tolerance range.

11. A tool in accordance with claim 1, wherein said upper end of said second measurement member has a magnet attached thereto, said magnet being adapted to temporarily attach to said reference surface.

12. A tool in accordance with claim 1, wherein said upper end of said second measurement member has a hook attached thereto, said hook being adapted to temporarily attach to said reference surface.

13. A tool in accordance with claim 1, wherein said upper end of said second measurement member has an adhesive element attached thereto, said adhesive element being adapted to temporarily attach to said reference surface.

14. A tool in accordance with claim 1, wherein said upper end of said second measurement member has a clamp attached thereto, said clamp being adapted to temporarily attach to said vehicle at said reference surface.

15. A tool for indicating whether a measured ride height of a vehicle meets a predetermined ride height, said measured ride height being equal to a vertical distance between a reference surface of said vehicle and an axis of rotation of a vehicle wheel, said tool comprising:
   a support member adapted to extend vertically upwards from a generally horizontal reference surface;
   a first measurement member, said first measurement member having (i) a slidable relationship with respect to said support member to allow relative vertical movement therebetween, and (ii) a first reference mark defined thereon; and
   a second measurement member, said second measurement member having (i) a slidable relationship with respect to said support member to allow relative vertical movement therebetween, (ii) a second reference mark defined thereon, and (iii) an upper end, wherein said second reference mark has a position selected to substantially align with said first reference mark when a vertical distance between said upper end of said second measurement member and said first reference mark corresponds to said predetermined ride height,
   wherein said first measurement member has a generally c-shaped structure adapted to surround said support member, said first measurement member being inwardly biased so as to engage said support member, and further comprising at least one squeeze tab extending from said first measurement member, said at least one squeeze tab being adapted to spread open said first measurement member when said at least one squeeze tab is pressed.

16. A tool in accordance with claim 1, further comprising a fastener adapted to releasably secure said first measurement member at a desired vertical position along said support member.

17. A tool in accordance with claim 1, further comprising a pointer, said pointer protruding from said first measurement member and being adapted to align with said rotational axis of said vehicle wheel when positioning said first measurement member such that a vertical position of said first reference mark corresponds to a vertical position of said rotational axis of said vehicle wheel.

18. A tool in accordance with claim 1, further comprising:
   a sound transmitting device attached to said second measurement member at said second reference mark, said sound transmitting device being adapted to emit sound waves at a selected frequency; and a sound receiving device attached to said first measurement member at said first reference mark, said sound receiving device being adapted to sense sound waves emitted by said sound transmitting device.

19. A tool in accordance with claim 18, further comprising a light indicator coupled to said sound receiving device, said light indicator being adapted to illuminate in response to sound of said selected frequency sensed by said sound receiving device.

20. A tool in accordance with claim 1, further comprising a laser attached to said first measurement member, said laser being adapted to act as a pointer.

21. A tool for indicating whether a measured ride height of a vehicle meets a predetermined ride height, said measured ride height being equal to a vertical distance between a reference surface of said vehicle and an axis of rotation of a vehicle wheel, said tool comprising:

a support member adapted to extend vertically upwards from a generally horizontal reference surface;

a first measurement member, said first measurement member being movably fixed relative to said support member and having a first reference mark defined thereon; and a second measurement member, said second measurement member having (i) a slidable relationship with respect to said support member to allow relative vertical movement therebetween, (ii) a slidable relationship with respect to said first measurement member to allow relative vertical movement therebetween, (iii) a second reference mark defined thereon, and (iv) an upper end, said upper end being removably attachable to said reference surface, wherein said second reference mark has a position selected to substantially align with said first reference mark when a vertical distance between said upper end of said second measurement member and said first reference mark corresponds to said specified ride height.

22. A tool in accordance with claim 21, wherein said first measurement member includes a range indicator representative of a tolerance range for said predetermined ride height.

23. A tool in accordance with claim 22, wherein said range indicator is provided by a tolerance window formed in said first measurement member, said tolerance window being a hole projecting through said first measurement member and a dimension of said tolerance window corresponding to said tolerance range.

24. A tool in accordance with claim 21, further comprising a pointer, said pointer protruding from said first measurement member and being adapted to align with said rotational axis of said vehicle wheel when positioning said first measurement member such that a vertical position of said first reference mark corresponds to a vertical position of said rotational axis of said vehicle wheel.

25. A tool for indicating whether a measured ride height of a vehicle is within a tolerance range for a specified ride height, said measured ride height being equal to a vertical distance between a reference surface of said vehicle and an axis of rotation of a vehicle wheel, said tool comprising:

a base;

a support member attached to said base and extending generally vertically upwards from said base when said base is positioned on a generally horizontal reference surface;

a view window formed in said support member along at least part of a longitudinal extent of said support member;

a first measurement member releasably attached to said support member so as to be vertically repositionable along and fixable relative to said support member;

a pointer attached to said first measurement member;

a range indicator, representative of said tolerance range, is provided on said first measurement member; and a second measurement member having a slidable relationship with respect to said support member to allow relative vertical movement therebetween, said second measurement member having an upper end adapted to temporarily attach to said reference surface, and said second measurement member having a mark defined thereon, said mark being adapted to be within said range indicator when a vertical distance between said upper end of said second measurement member and said range indicator corresponds to said measured ride height being within said tolerance range.

26. A tool in accordance with claim 25, wherein said range indicator is a hole projecting through said first measurement member, and a dimension of said range indicator corresponds to said tolerance range of said specified ride height.

27. A tool for measuring a ride height of a vehicle, said ride height being equal to a vertical distance between a reference surface of said vehicle and an axis of rotation of a vehicle wheel, comprising:

a support member adapted to extend vertically upwards from a generally horizontal reference surface;

a first measurement member releasably attached to said support member so as to be vertically repositionable along said support member, said first measurement member having a first reference mark defined thereon; and a second measurement member having a slidable relationship with respect to said support member to allow relative vertical movement therebetween, said second measurement member having a graduated scale defined thereon and an upper end adapted to be removably attachable to said reference surface such that said first reference mark aligns with a vertical position on said graduated scale to indicate a measurement of said ride height when said upper end is vertically aligned with said reference surface.

28. A tool in accordance with claim 27, wherein said graduated scale is in inch increments.

29. A tool in accordance with claim 27, wherein said graduated scale is in metric unit increments.

30. A tool in accordance with claim 27, wherein said first measurement member comprises a range indicator, said range indicator being adapted to provide a tolerance range for said ride height measurement.

31. A method of setting a ride height of a vehicle within a predetermined tolerance range for said ride height, said ride height being equal to a vertical distance between a reference surface of said vehicle and an axis of rotation of a vehicle wheel, said method comprising the steps of providing a tool to measure said ride height, said tool having a support member, a first measurement member, and a second measurement member;

vertically positioning said first measurement member along said support member of a tool such that a first reference mark defined on said first measurement member corresponds with a vertical position of said rotational axis of said vehicle wheel;

removably attaching an upper end of said second measurement member of said tool to said reference surface;

determining whether a second reference mark defined on said second measurement member is substantially aligned with said first reference mark within said predetermined tolerance range, and if said second reference mark is not substantially aligned with said first reference mark within said predetermined tolerance range, then adjusting a suspension of said vehicle and repeating said method.

32. A method in accordance with claim 31, further comprising a range indicator defined on said first measurement member at said first reference mark, said range indicator being adapted to provide said predetermined tolerance range for said ride height.

33. A method in accordance with claim 31, further comprising a range indicator defined on said second measurement member at said second reference mark, said range indicator being adapted to provide said predetermined tolerance range for said ride height.

34. A method of setting a ride height of a vehicle within a predetermined tolerance range for said ride height, said ride height being equal to a vertical distance between a reference surface of said vehicle and an axis of rotation of a vehicle wheel, said method comprising the steps of:

providing a tool to measure said ride height, said tool having a support member, a first measurement member, and a second measurement member;

vertically positioning said first measurement member along said support member of said tool such that a first reference mark defined on said first measurement member corresponds with a vertical position of said rotational axis of said vehicle wheel;

temporarily attaching an upper end of said second measurement member of said tool to said reference surface, determining whether a second reference mark defined on said second measurement member is substantially aligned with said first reference mark within said predetermined tolerance range; and if said second reference mark is not substantially aligned with said first reference mark within said predetermined tolerance range, then adjusting a suspension of said vehicle and repeating said method while maintaining said temporary attachment of said upper end to said reference surface during said adjusting of said suspension.

35. A method in accordance with claim 34, further comprising a range indicator defined on said first measurement member at said first reference mark, said range indicator being adapted to provide said predetermined tolerance range for said ride height.

36. A method in accordance with claim 34, further comprising a range indicator defined on said second measurement member at said second reference mark, said range indicator being adapted to provide said predetermined tolerance range for said ride height.

37. A method of measuring a ride height of a vehicle, said ride height being equal to a vertical distance between a reference surface of said vehicle and an axis of rotation of a vehicle wheel, said method comprising the steps of:

providing a tool having a first measurement member and a second measurement member, wherein said first measurement member and said second measurement member are capable of relative movement therebetween, and wherein at least one of said first measurement member and said second measurement member includes a tolerance indicator that is representative of an acceptable tolerance range for a specified ride height;

establishing a fixed reference point using said first measurement member, wherein said fixed reference point corresponds to said rotational axis of said vehicle wheel;

measuring a ride height by removably attaching said second measurement member to said reference surface of said vehicle, wherein said measured ride height is a vertical distance between said reference surface and said fixed reference point, and adjusting a suspension of said vehicle, if necessary, until said measured ride height corresponds to said specified ride height within said acceptable tolerance range.

38. A method of measuring a ride height of a vehicle, said ride height being equal to a vertical distance between a reference surface of said vehicle and an axis of rotation of a vehicle wheel, said method comprising the steps of:

providing a tool to measure said ride height, said tool having a support member, a first measurement member, and a second measurement member;

vertically positioning and fixing said first measurement member along said support member of said tool such that a first reference mark, defined on said first measurement member, corresponds with a vertical position of said rotational axis of said vehicle wheel;

removably attaching an upper end of said second measurement member of said tool to said reference surface; and reading a measurement where said first reference mark substantially aligns with a vertical position on a graduated scale defined on said second measurement member, wherein said measurement corresponds to said ride height.

* * * * *